March 22, 1966   J. G. FONTAINE   3,241,883
SEAT BELT SYSTEM FOR MOTOR VEHICLES
Filed June 12, 1963   5 Sheets-Sheet 2

INVENTOR.
JOHN G. FONTAINE
BY
ATTORNEY

March 22, 1966 J. G. FONTAINE 3,241,883
SEAT BELT SYSTEM FOR MOTOR VEHICLES
Filed June 12, 1963 5 Sheets-Sheet 3

INVENTOR.
JOHN G. FONTAINE
BY
ATTORNEY

March 22, 1966 J. G. FONTAINE 3,241,883
SEAT BELT SYSTEM FOR MOTOR VEHICLES
Filed June 12, 1963 5 Sheets-Sheet 4

INVENTOR.
JOHN G. FONTAINE
BY
ATTORNEY

March 22, 1966   J. G. FONTAINE   3,241,883
SEAT BELT SYSTEM FOR MOTOR VEHICLES

Filed June 12, 1963   5 Sheets-Sheet 5

INVENTOR.
JOHN G. FONTAINE
BY
ATTORNEY

United States Patent Office 3,241,883
Patented Mar. 22, 1966

3,241,883
SEAT BELT SYSTEM FOR MOTOR VEHICLES
John Garfield Fontaine, 2817 NE. 26th Court,
Fort Lauderdale, Fla.
Filed June 12, 1963, Ser. No. 287,272
5 Claims. (Cl. 297—388)

This invention relates to safety belts for automobiles and more particularly to a mechanism by means of which a safety belt, or a number of safety belts, can be retracted and held out of the way of an automobilist and especially when the user is entering or leaving the car. By such an arrangement the possibility of accident or injury to the car user is avoided.

The conventional seat belts as in use at the present time usually rest on the floor of the car when not in operative employment, and with the hardware or fastening elements exposed. It is therefore always possible that the car user might catch in these belt parts or trip over them when entering or leaving the car and thus fall with possible injury. This is particularly true in the case of females wearing highheeled shoes.

Another inherent disadvantage found in standard seat belts is that they are likely to get caught in the door frames of the car thus preventing a car door from being closed and leading to a condition likely to result in an accident.

It is therefore an object of the present invention to provide a mechanism by which safety belts can be retracted when not in use and thus drawn out of the way of entering or leaving passengers so that any of the possible contingencies above mentioned will be eliminated.

It is another object of the invention to provide a safety belt retracting device by which belts for both the front and rear seats of a car can be retracted when not in use, but can be selectively drawn forward into operative position whenever required.

A further and important object of the invention is to provide a safety belt that is self-adjusting to thus eliminate the necessity of the user of the device to adjust the belt to his particular size and this of course relates primarily to the front seat belts where the front seat is power driven forwardly or rearwardly.

A further object of the invention is to provide a safety belt of the character hereinafter described that will permit the user of the belt to so adjust the belts that the buckle may be disposed in any comfortable position, such as to the side of the individual such being possible by simply pulling out one of the belts at a time and moving the buckle to either side of the person also, it is still another object to provide the seat belt device that can be locked in position for relieving the spring pressure of the belt upon the body of the user.

With these and other objects to be hereinafter set forth in view, I have devised the arrangement described and more particularly pointed out in the claims appended hereto.

In the accompanying drawings.

Figure 13:
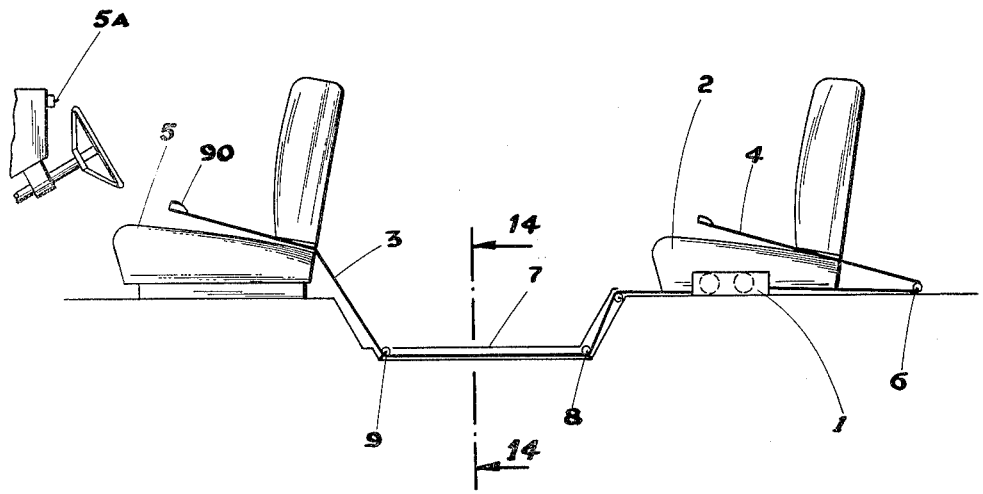
FIG. 13 is a diagramatic view showing how the belt-retracting device is installed in an automobile.
Figure 14:
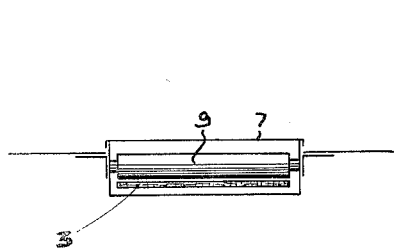
FIG. 14 is a sectional view, taken substantially on the line 14—14 of FIG. 13, looking in the direction of the arrows.
Figure 15:
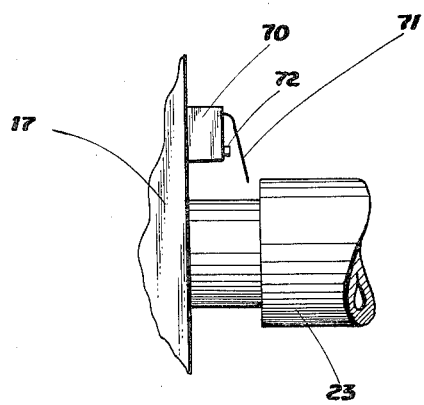
FIG. 15 is a fragmentary elevational view showing an interrupted switch for a seat operated motor.

The invention herein described includes a housing, generally indicated at 1, arranged for installation as shown in FIGS. 13 and 14 and preferably under the rear seat 2 of an automobile. The housing contains two sets of seat belts, the set for the front seat 5 being indicated at 3, and that for the rear seat 2 being indicated at 4. Two of the units can thus supply four seats in the automobile with saftey belts. The rear belts 4 are extended forwardly over the rear seat, after having been first extended rearwardly out of the housing 1 to pass around guide rollers 6 and then extended forwardly between the rear seat cushion and back. The front belts 3 extend forwardly from the housing 1, under the floor covering 7 and under guide rollers 8 and 9 to extend to the front seat 5 to be coupled together for use about the driver or front seat occupant.

To accommodate the belt pairs 3 and 4, two parallel two-part shafts are rotatively mounted in the casing 1, both shafts being similar, and that which is shown at 10 will be first described.

The shaft 10 is divided into two separate sections indicated respectively at 11 and 12, the section 11 having one end rotatively supported on a pin 13 (FIG. 2) threadably mounted in a side wall 14 of the casing or housing 1 and held by the lock nut 15. Near its opposite end, the shaft section 11 is mounted in a nylon bearing 16 provided in an upstanding wall or flange 17 in the housing.

The opposite section 12, which is axially aligned with the shaft section 11, is similarly mounted. That is to say, it is rotatively supported at one end by a pin 13a (FIG. 2) maintained by the lock nut 15a, and is supported near its opposite end in a bearing 16a mounted in a wall or flange 17a in the housing 1.

Figure 1:
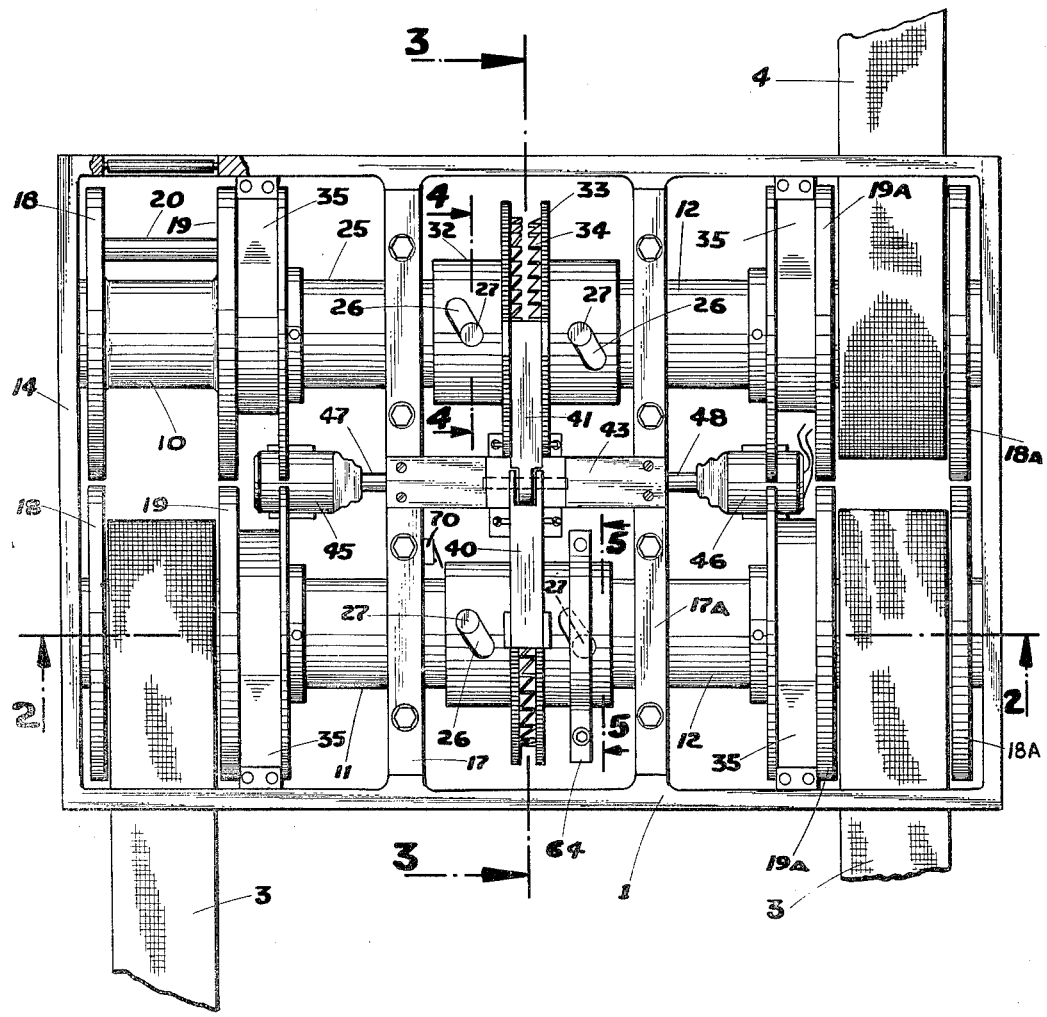
FIG. 1 is a top plan view of the apparatus for retracting safety belts, as constructed according to the invention.
Figure 2:
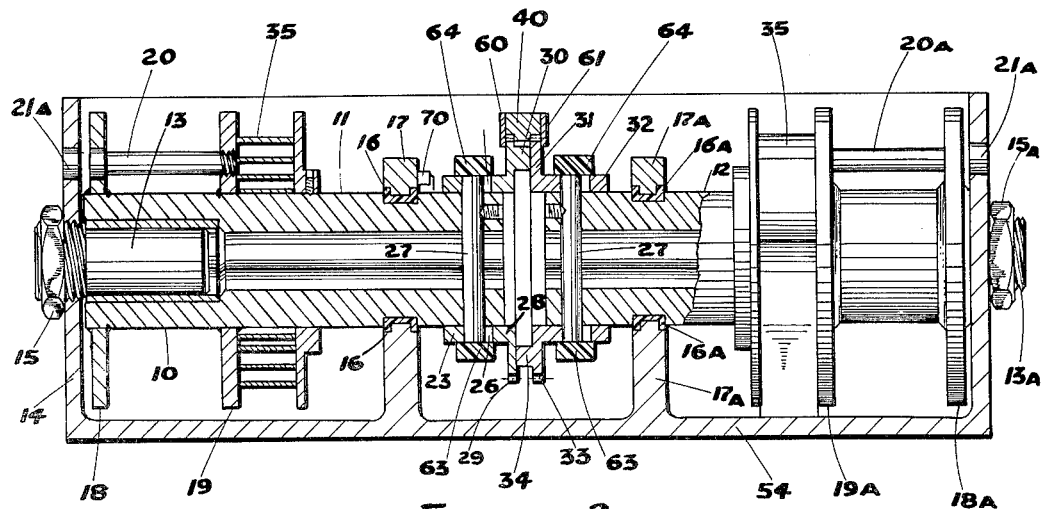
FIG. 2 is a sectional view, taken substantially on the line 2—2 of FIG. 1, looking in the direction of the arrows.
Figure 3:
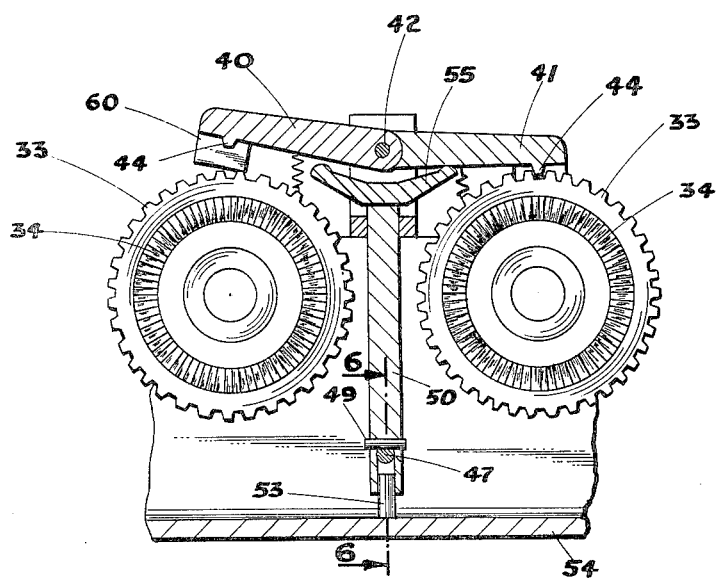
FIG. 3 is a sectional view, taken substantially on the line 3—3 of FIG. 1, looking in the direction of the arrows.
Figure 4:
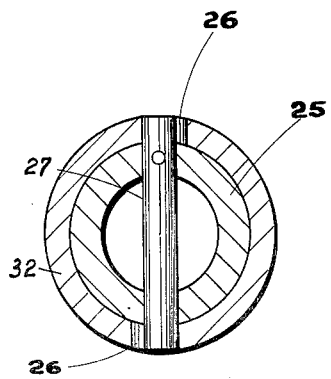
FIG. 4 is a sectional view, taken substantially on the line 4—4 of FIG. 1, looking in the direction of the arrows.
Figure 6:
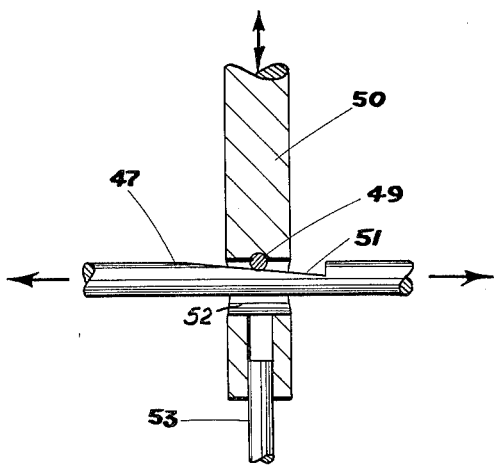
FIG. 6 is a sectional view, taken substantially on the line 6—6 of FIG. 3, looking in the direction of the arrows.

The shaft section 11 is provided adjacent to one end with a pair of spaced disks 18 and 19 which are connected by a belt-mounting pin 20 located eccentrically to the shaft section 11 and fitted in position between the disks by insertion through a hole 21a in the wall of the housing. One end of the belt is looped around and is thus attached to this pin 20. The second belt 3, or that shown at the right in FIGS. 1 and 2, is similarly attached to the mounting pin shown at 20a located between the two disks 18a and 19a on the shaft section 12. It will be understood from the foregoing that the belts 3 will, when retracted, become wound around the shaft sections 11 and 12 between the respective disks 18 and 19 and 18a and 19a, by rotative movement in the opposite directions of the sections 11 and 12.

The belts 3, 3 are respectively wound on the shaft sections 11 and 12 so that the shaft 11 will rotate in a direction opposite to that of the shaft 12 during winding or unwinding of the belts.

Thus far, one of the main shafts has been described namely, that employed for the belts for the front seat, but as previously stated and as seen in FIG. 1, two of these shafts of similar construction are employed and associated with similar belt-retracting means. The second shaft, generally indicated at 25, is employed for the rear seat belts, or those indicated at 4. The parts of the shaft 25, being similar to the parts of the shaft 10, are thus indicated by similar reference characters.

Each of the two main shafts 10 and 25 is divided into its two sections at a substantially center point, which arrangement permits each of the belts connected to the shaft sections to move independently of the other belt.

Slidably movable to a limited extent on the inner end of the shaft section 11 is a sleeve or bushing 23, said bushing having angular or inclined slots 26 engaged by a pin 27 extending transversely through the shaft section 11. This pin-and-slot arrangement permits the sleeve or bushing 23 to have a limited rotative as well as axial movement relative to the shaft section 11 on which it is mounted.

Provided on or forming an integral part of the sleeve or bushing 23 is a disk ratchet member 28 which is peripherally toothed as shown at 29, and which is also provided on its face with projecting ratchet teeth 30. The disk 28 is opposed to a similar disk 31 provided on a bushing or sleeve 32 movably mounted on the shaft section 12 in the manner of the sleeve or bushing 23. The disk ratchet member 31 is peripherally toothed as shown at 33 and is provided on its face with ratchet teeth 34, the latter teeth being capable of disengagement from or engagement with the ratchet teeth 30 when required and as indicated respectively in FIGS. 7 and 8. This arrangement provides means by which the two shaft sections 11 and 12 can be coupled together, yet it allows for independent movement of each individual belt, or it acts as a locking device when both belts are drawn out of the casing simultaneously and particularly when the belts are joined together in passenger-restraining position.

Figure 7:
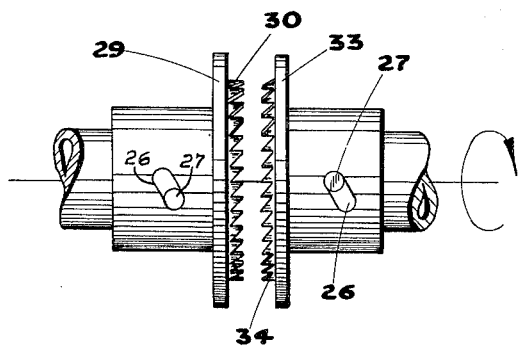
FIG. 7 is a view showing the locking ratchets in separated or disengaged position.

Each of the shaft sections 11 and 12 is provided with a torsional retraction spring 35 that is operative to retract the belts when the same are not in use. When the user of a belt assumes his position on the front seat for example, he grasps the belt 3, or that which is provided with the buckle 90 (FIG. 13) and which is located at the right in FIG. 1 and which, like its companion belt 3, is then in a retracted position, and in which position the belts are held by the force of the springs 35. The buckle-bearing belt is pulled forwardly to the required extent, the same during this movement, unwinding from the shaft section 12. While this belt is being pulled forwardly and is being drawn out of the housing 1, its companion belt 3 remains untouched and in its retracted position. During the advancement of the buckle-bearing belt 3, the shaft section 12 is free to rotatively move independently of its companion shaft section 11 because at this time the ratchet teeth 30 and 34 are apart or disengaged substantially as shown in FIG. 7 so that the shaft section 12 can turn as indicated by the arrow without imparting rotative movement to the shaft section 11.

As soon as the first belt, or that bearing the buckle is advanced forwardly and brought to a rest position, so that the shaft section 12 is no longer rotating, the second belt section 3, or that to the left in FIG. 1, is pulled out and engaged with the buckle on the first belt. During this extension of the second belt section, the shaft on which it is wound is rotated in a direction opposite to the direction of rotation of the shaft bearing the first belt. The joining together of the two belts and the now-existing pressure on the two joined belts, starts the locking action of the apparatus. When forward pressure is simultaneously imposed on the two joined belts, the locking disks or ratchet members 28 and 31, will slide toward one another, such action being attained by means of the slots 26 and the inertia pins 27 which extend therethrough.

Figure 8:
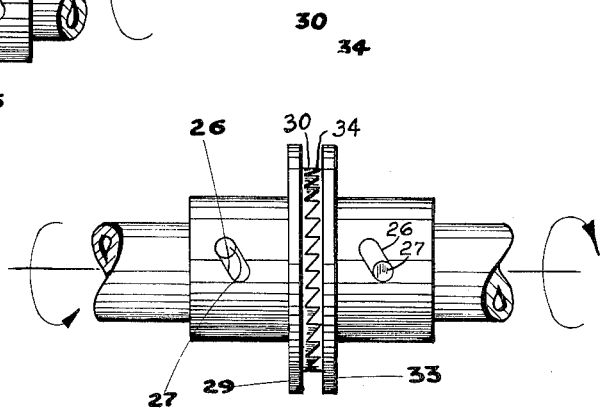
FIG. 8 is a view showing the locking ratchets in their engaged position.

Thus, when both shaft sections 11 and 12 are rotatively moved in unison and in opposite directions, the ratchet teeth 30 and 34 will become engaged as shown in FIG. 8, and the two shaft sections 11 and 12 will be locked together, thus preventing any further extension of the connected belts out of the housing 1. The ratchets will remain engaged as long as pressure is imposed on both belts. That is to say, any forward pull on the engaged belts, such as caused by a sudden stop or an accident will cause the belts to act similarly to the conventional floor-mounted safety belt.

To overcome the retracting force caused by the springs 35 on the shaft sections and to also devise a means to lock the unit thereby not depending upon body inertia to activate a self-acting electrically operated locking means is included in the apparatus. This locking means includes a pair of levers indicated respectively at 40 and 41, which are pivotally attached at one end by a pin 42 in a bracket 43 which extends between the two walls 17 and 17a in the housing. Each of the levers 40 and 41 is provided at one end with a tooth or dog 44 located between side plates 60 and 61, and which dogs are adapted, when the levers are in their lowered position as shown in FIGS. 11 and 12, to engage with the peripheral teeth 29 and 33 on the ratchet disks.

Figure 11:
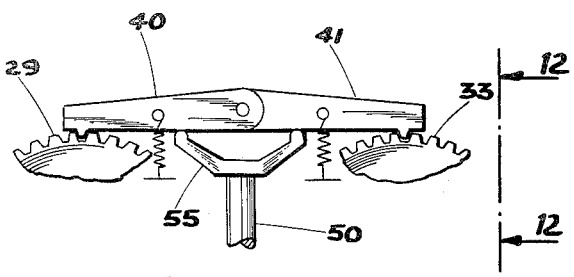
FIG. 11 shows the same mechanism as in FIG. 9, but with the locking levers in the engaged position.
Figure 12:
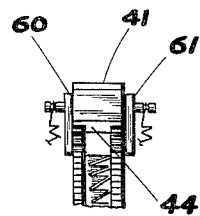
FIG. 12 is a view taken on the line 12—12 of FIG. 11, looking in the direction of the arrows.

The pivoted levers 40 and 41 can be brought into their engaged position shown in FIGS. 11 and 12 or disengaged by the operation of a push-button 5a (FIG. 13) and which can be located on the dash-board of the automobile, the operation of the push-button being effective to energize one or the other of the solenoids 45 and 46, the axial movement of the core-rod thereof being transmitted by means of a transport pin 49 to the vertical movement of a lifter or transport tube 50. The core-rod 47 of the solenoids has a cam surface 51 operative upon the pin 49 to thereby cause elevation or permit of the descent of the tube 50, said tube having a transverse passage or slot 52 extending through it and through which the core-rod 47 is slidably movable under the action of the solenoids. The lower part of the tube 50 is vertically guided by means of an upstanding pin 53 arising from the bottom wall 54 of the housing 1.

At its upper end of the transport tube is provided with a forked lifter 55 which engages under the levers 40 and 41 and when the transport tube 50 is elevated by the movement of the solenoid core-tube 47, it will pivot the levers 40 and 41 in a manner to cause them to disengage with the peripheral teeth 29 and 33, thus releasing the holding of the ratchet members 28 and 31 against rotative movement and hence permitting rotative movement of the shaft sections 11 and 12. It is to be noted that the levers 40 and 41 are so shaped and arranged that they will engage with the teeth 29 and 33 only when the two ratchet members 28 and 31 are brought together and their teeth 30 and 34 are completely engaged, as shown in FIG. 8. If the ratchet members 28 and 31 are separated, such as takes place during the pull-out of one belt only, or during the retracted position, the locking levers 40 and 41 will not become engaged with the ratchet members. This result is attained by means of the side plates 60 and 61 which bind the dogs or teeth 44 mounted on the locking levers. This arrangement allows for the locking of only one set of belts at a time, a situation which exists only when the front seat is occupied.

Figure 5:
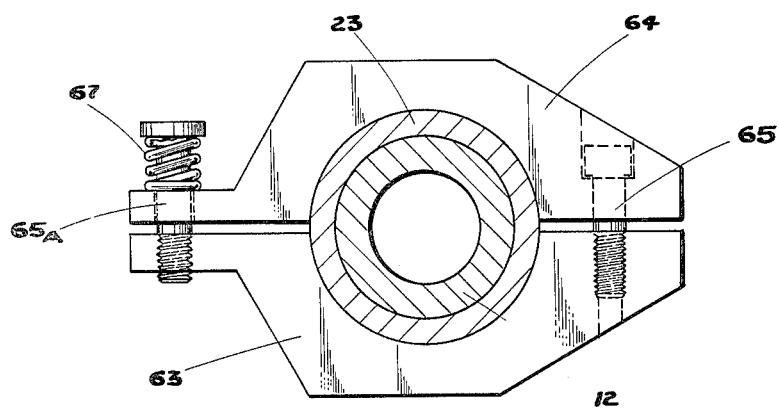
FIG. 5 is a sectional view, taken substantially on the line 5—5 of FIG. 1, looking in the direction of the arrows.

The levers 40 and 41 are spring-biased by springs 62, causing them to follow the fork 55 in its raising or lowering movements. Each of the ratchet member sleeves or bushings 23 and 32 is prevented from rotation during the belt pull-out by means of a friction brake shown in FIG. 5 and which includes co-operating shoes 63 and 64. The shoe 63 is provided with studs 65 on which the shoe 64 is movably mounted, said shoe 64 being spring-biased by means of the coil spring 67 arranged around the stud 65a.

In order to avoid damaging the electric motor normally employed to shift the front seat, there has been provided a switch device 70, fixed to the side of the bearing 17 and with the switch 70 having a spring tongue 71 that is in the line of shifting movement of the bushing 23. The tongue 71 engages a button 72, whereby to interrupt the flow of current to the seat motor and whereby to protect the motor when the seat is activated and while the belts are connected about the body of the user.

From the foregoing, the operation of the described apparatus will be readily understood. The belts are fitted in place around a seat occupant by first pulling one of the belt sections forwardly and then pulling its companion section forwardly and then coupling the two belt sections together by the use of the conventional buckle fastening. The construction described permits the two sections of the belts to be independently pulled forwardly, but when the belt sections are joined together and a simultaneous pull is exerted on the joined belt sections, the ratchets 30 and 34 will have become engaged and the sections 11 and 12 of the shaft 10 will have become locked together. When the disks or ratchet members 28 and 31 come together as above described, the side plates 60 and 61 on the levers 40 and 41 can clear the ratchet members and the dogs or teeth 44 can engage the peripheral teeth on the ratchet members, thus positively holding the shaft sections 11 and 12 against rotation while preventing the belts from being extended.

To separate the ratchet disks 29 and 33 to allow the belts to be retracted, it is merely necessary to uncouple the ends of the belts and first draw one end slightly forward to separate one of the disks from the other to disengage the ratchet teeth, and then allow said end to be retracted, after which the second belt-end can be readily retracted by its spring.

Figure 9:
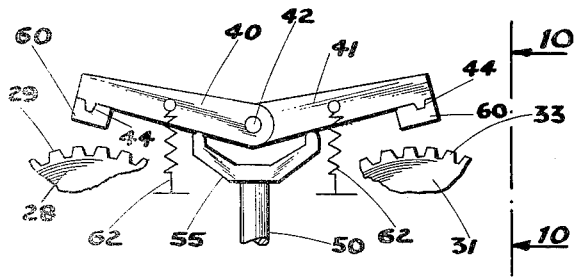
FIG. 9 show the locking levers and parts associated therewith in disengaged position.
Figure 10:
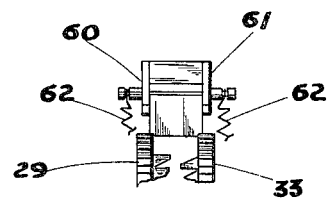
FIG. 10 is a view taken on the line 10—10 of FIG. 9, looking in the direction of the arrows.

To release the belts the locking levers 40 and 41 are pivotally moved as in FIG. 9 by solenoid operation, thus disengaging the dogs or teeth 44 from the peripheral tooth on the ratchet members and permitting the ratchet members to move past one another rotatively as the shaft sections 11 and 12 are permitted to rotate to retract the belts under the pull of the springs 35 as each belt is released from the hand of the user.

Having thus described an embodiment of the invention, it is obvious that the same is not to be restricted thereto, but is broad enough to cover all structures coming within the scope of the annexed claims.

What I claim is:

1. A retracting device for safety belts comprising, a housing, a pair of axially-aligned shaft sections in said housing, each shaft section having a belt attached to it and oppositely wound on it so that a simultaneously exerted withdrawal pull on both of the belts causes rotative movement of the shaft sections in opposite directions, a ratchet disk at the end of each of the shaft sections, the disks being opposed to each other and presenting ratchet teeth toward one another, the disks having limited axial movement on their shaft sections in a manner to cause engagement or disengagement of their ratchet teeth, pin-and-slot coupling means between the disks and the shaft sections, the slots of said coupling means being inclined to provide for the limited axial movements of the disks on their shaft sections, and whereby a simultaneous withdrawal pull exerted on both belts will rotate the disks in opposite directions to bring their ratchet teeth in interengagement and cause opposite rotative movement of the shaft sections to be blocked to prevent further simultaneous withdrawal movements of the belts from the shaft sections.

2. A retracting device for automobile safety belts as provided for in claim 1, wherein each ratchet disk includes a sleeve having a limited slidable and rotative movement relative to its shaft section, each ratchet disk being peripherally toothed, and electrically controlled locks for engagement with the peripherally toothed portions of the ratchet means to hold the same against rotation.

3. A retracting device for safety belts as provided for in claim 1, wherein the ratchet disks have peripheral teeth, pivoted locking levers disposed over the disks and having dogs for engagement with the peripheral teeth to lock the disks against rotative movement, and means for preventing engagement of the dogs with the peripheral teeth on the ratchet disks when said disks are in separated relation.

4. A retracting device for safety belts as provided for in claim 3, including solenoid means for causing the levers to bring their dogs into engagement with the peripheral teeth.

5. A retracting device for safety belts comprising, a pair of rotative shaft sections disposed in axial alignment, each of said shaft sections carrying a belt, the belts being wound in opposite directions on the shaft sections so that opposite rotative movement will be imparted to the respective shaft sections when the belts are simultaneously drawn outwardly from the shaft sections, a disk mounted on each shaft section, the disks presenting their faces toward one another, the opposed faces of the disks having ratchet teeth for interengagement when the two disks are moved axially to a limited extent on the shaft sections by simultaneous withdrawal pull exerted on the belts, a pin-and-slot coupling means between each disk and its shaft section, said coupling means including an angular slot by which the limited axial movement of the disks relative to their shaft sections is attained by belt withdrawal movement, and spring means for retracting the belts when the disks are in separated relation.

References Cited by the Examiner

UNITED STATES PATENTS

| | | | |
|---|---|---|---|
| 431,066 | 7/1890 | Leverich | 192—94 X |
| 2,071,903 | 2/1937 | Shively | 280—150 |
| 2,843,335 | 7/1958 | Hoven et al. | 297—388 X |
| 2,883,123 | 4/1959 | Finnigan | 297—388 X |
| 2,899,146 | 8/1959 | Barecki | 297—388 |
| 2,905,231 | 9/1959 | Olson | 297—388 X |

FOREIGN PATENTS 777,981   7/1957   Great Britain.

FRANK B. SHERRY, *Primary Examiner.*

R. B. FARLEY, *Assistant Examiner.*